United States Patent
Shiokawa

(10) Patent No.: US 11,506,536 B2
(45) Date of Patent: Nov. 22, 2022

(54) MEASURING APPARATUS

(71) Applicant: Kioxia Corporation, Minato-ku (JP)

(72) Inventor: Taro Shiokawa, Nagoya (JP)

(73) Assignee: Kioxia Corporation, Minato-ku (JP)

( * ) Notice: Subject to any disclaimer, the term of this patent is extended or adjusted under 35 U.S.C. 154(b) by 641 days.

(21) Appl. No.: 16/561,473

(22) Filed: Sep. 5, 2019

(65) Prior Publication Data

US 2020/0292387 A1 Sep. 17, 2020

(30) Foreign Application Priority Data

Mar. 14, 2019 (JP) .............................. JP2019-047109

(51) Int. Cl.
| | |
|---|---|
| G01J 3/28 | (2006.01) |
| G01J 3/02 | (2006.01) |
| G06F 11/30 | (2006.01) |
| G01N 21/31 | (2006.01) |
| G01N 21/21 | (2006.01) |
| G01J 3/18 | (2006.01) |

(52) U.S. Cl.
CPC .............. *G01J 3/28* (2013.01); *G01J 3/0208* (2013.01); *G01J 3/0224* (2013.01); *G01N 21/21* (2013.01); *G01N 21/314* (2013.01); *G06F 11/3003* (2013.01); *G01J 2003/1828* (2013.01); *G01N 2021/213* (2013.01)

(58) Field of Classification Search
CPC ............. G01J 2003/1828; G01J 3/0208; G01J 3/0224; G01J 3/0264; G01J 3/28; G01N 2021/213; G01N 21/21; G01N 21/314; G01N 2201/129; G06F 11/3003
See application file for complete search history.

(56) References Cited

U.S. PATENT DOCUMENTS

| | | |
|---|---|---|
| 5,121,337 A | 6/1992 | Brown |
| 6,268,226 B1 | 7/2001 | Angell et al. |
| 2007/0038041 A1* | 2/2007 | Yang .................... G01N 21/59 356/300 |
| 2015/0219446 A1 | 8/2015 | Leem et al. |

FOREIGN PATENT DOCUMENTS

JP 2017-187820 A 10/2017

* cited by examiner

*Primary Examiner* — Mark R Gaworecki
(74) *Attorney, Agent, or Firm* — Oblon, McClelland, Maier & Neustadt, L.L.P.

(57) ABSTRACT

According to one embodiment, there is provided a measuring apparatus including a measurement section and a control section. The measurement section is configured to acquire a response from a sample. The control section is configured to compare a loading obtained by performing principal component analysis in advance with a first evaluation-use loading obtained by performing principal component analysis onto the response acquired from the sample, and to generate a first reliability index for measurement using principal component analysis, in accordance with a comparison result.

20 Claims, 8 Drawing Sheets

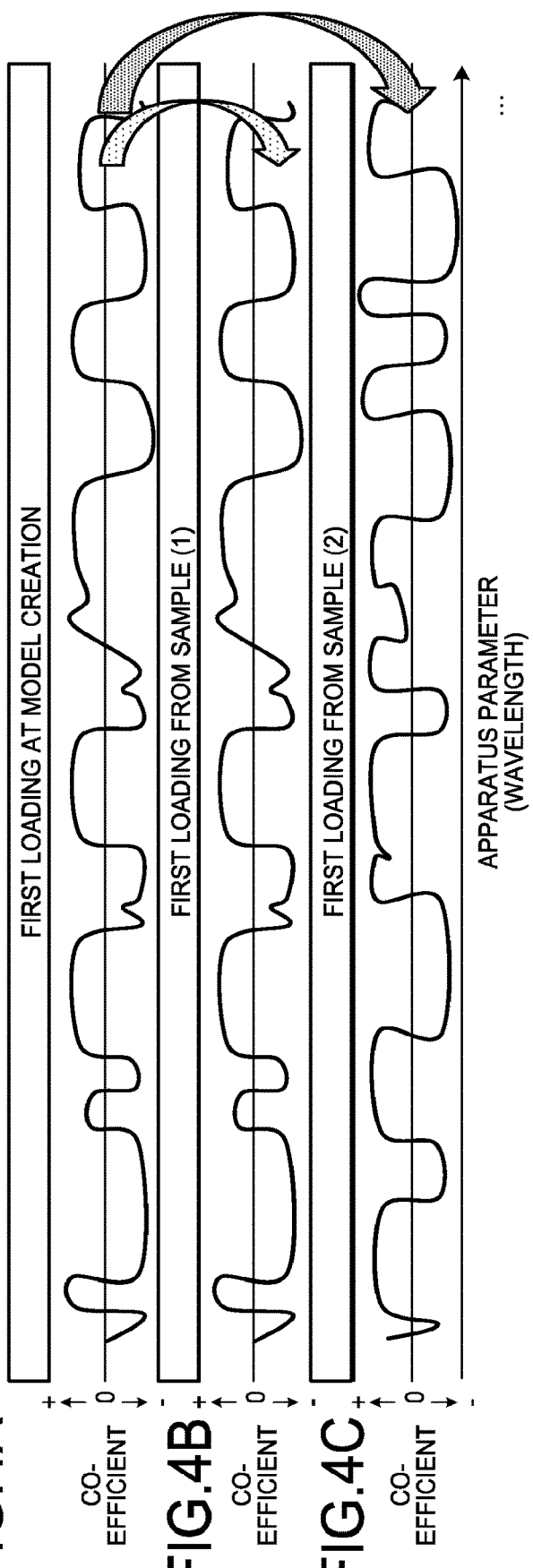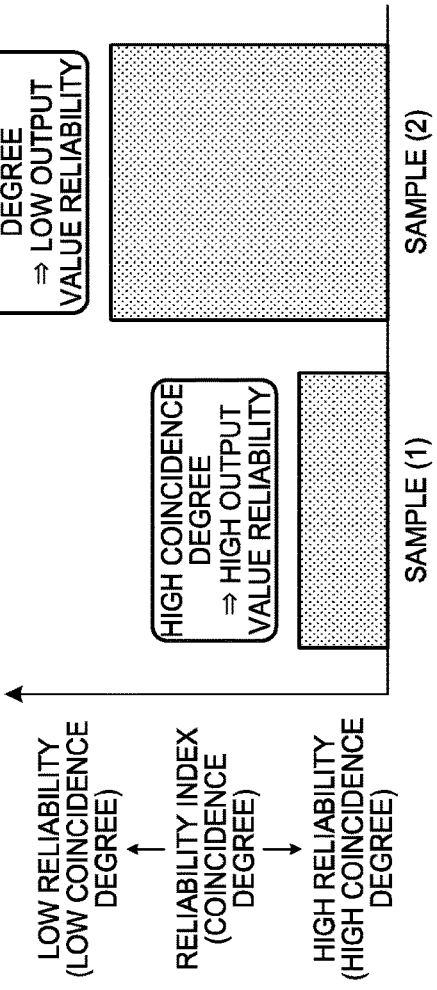

MEASURING APPARATUS

CROSS-REFERENCE TO RELATED APPLICATIONS

This application is based upon and claims the benefit of priority from Japanese Patent Application No. 2019-047109, filed on Mar. 14, 2019; the entire contents of which are incorporated herein by reference.

FIELD

Embodiments described herein relate generally to a measuring apparatus.

BACKGROUND

In a measuring apparatus, there is a case where principal component analysis is performed in advance to derive a loading and a regression coefficient, and a measurement value is obtained by using the loading and the regression coefficient (regression model) when a response is acquired by measuring a sample. At this time, it is desired to improve the reliability of the measurement.

BRIEF DESCRIPTION OF THE DRAWINGS

FIGS. 4A to 4D are diagrams illustrating a loading comparison process according an example of the embodiment;

DETAILED DESCRIPTION

Figure 1:
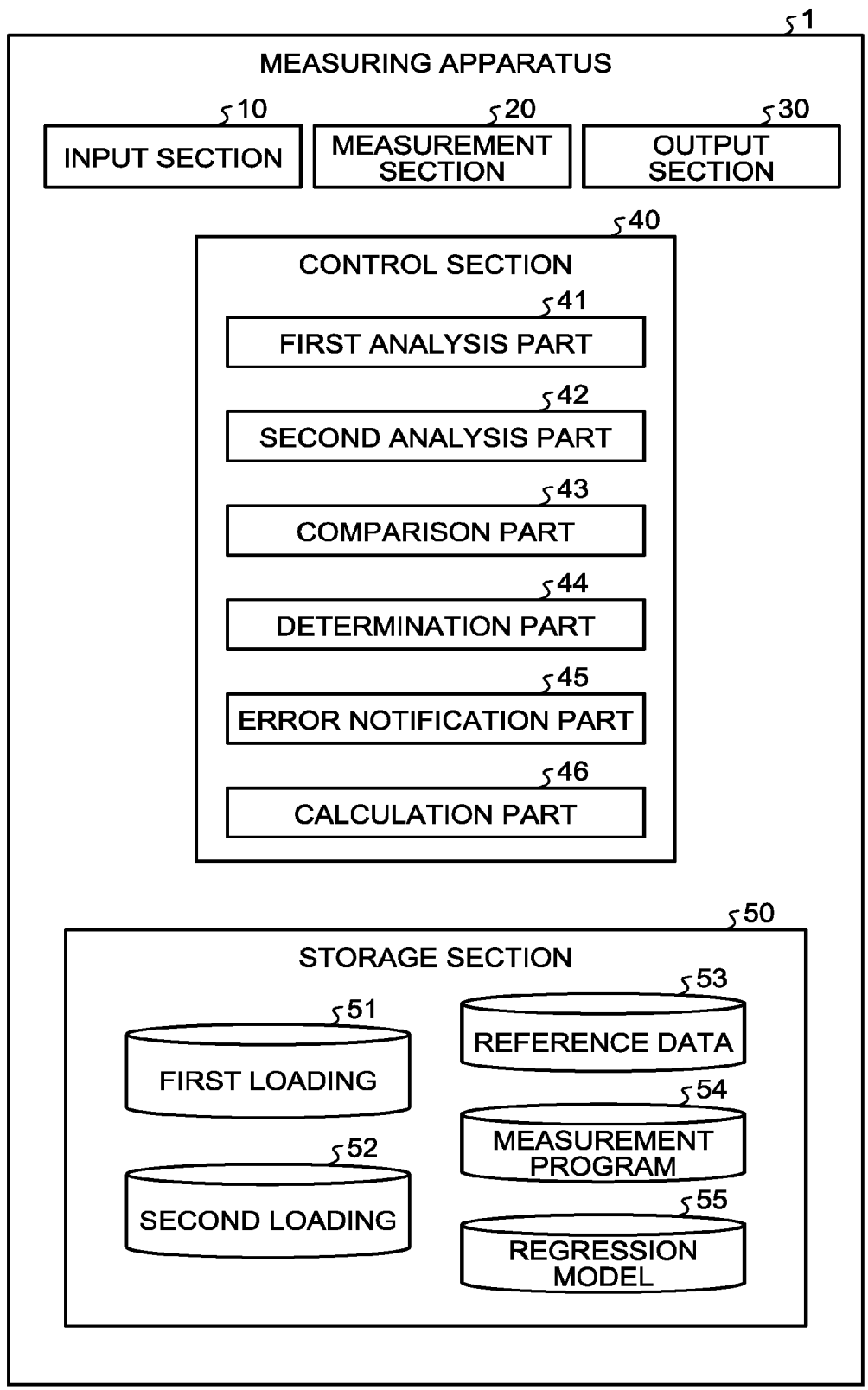
FIG. 1 is a diagram illustrating a configuration of a measuring apparatus according to an embodiment.

In general, according to one embodiment, there is provided a measuring apparatus including a measurement section and a control section. The measurement section is configured to acquire a response from a sample. The control section is configured to compare a loading obtained by performing principal component analysis in advance with a first evaluation-use loading obtained by performing principal component analysis onto the response acquired from the sample, and to generate a first reliability index for measurement using principal component analysis, in accordance with a comparison result.

Exemplary embodiments of a measuring apparatus will be explained below in detail with reference to the accompanying drawings. The present invention is not limited to the following embodiments.

Embodiment

A measuring apparatus according to an embodiment is, for example, an apparatus configured to perform measurement by causing light, X-rays, electron rays, or the like to be incident onto a sample to acquire a response therefrom (for example, spectra observed from the sample), and to obtain a measurement value in accordance with the response by using reference data. As this response indicates relative information, the reference data, which indicates a reference value, is used to obtain absolute information as a measurement value. In general, this reference data is often obtained by physical analysis or the like, and is often time-consuming and cost-requiring to obtain.

In order to perform measurement efficiently, it is conceivable to use a result of a numerical simulation instead of reference data by physical analysis. A response obtained by the numerical simulation is compared with a response obtained from the measurement of an actual sample, and a simulation parameter (for example, a dimension in the case of dimension measurement) that gives a numerical simulation response closest to the response obtained from the measurement of the actual sample is estimated to be closest parameter to a parameter of the actual sample. In this case, the number of pieces of reference data needed by the physical analysis can be reduced.

As means for improving accuracy as compared with measurement using a numerical simulation, it is conceivable to apply Principal Component Analysis (PCA) and Principal Component Regression (PCR), which are utilized in the field of multi-variable analysis, to the present measurement. In the principal component analysis (PCA), a loading is obtained as a coefficient vector for obtaining a principal component by multiplication with a response, such as spectral data. In the principal component regression (PCR), a regression coefficient (regression model) is obtained by using the principal component obtained by the loading and reference data. In actual measurement, a measurement value is obtained from measurement spectra by using the loading and the regression coefficient (regression model). In this series of flow until obtainment of a measurement value, there is no index for confirming the reliability of the measurement value in principle. Accordingly, it is difficult to determine whether measurement by a measuring apparatus is erroneous measurement or not.

In consideration of the above, according to this embodiment, a measuring apparatus is configured to compare a loading obtained in advance in model creation with an evaluation-use loading obtained from spectra of a measurement sample, and to generate a reliability index in accordance with the comparison result, so that it is possible to perform reliability evaluation in measurement using the principal component analysis.

Specifically, a measuring apparatus 1 may be configured as illustrated in FIG. 1. FIG. 1 is a diagram illustrating a configuration of a measuring apparatus according to the embodiment.

The measuring apparatus 1 includes an input section 10, a measurement section 20, an output section 30, a control section 40, and storage section 50.

When the measuring apparatus 1 is activated, the control section 40 reads a measurement program 54 stored in the storage section 50, and integrally controls the respective sections of the measuring apparatus 1 in accordance with the measurement program 54.

The input section 10 serves as an interface for obtaining information from outside. The input section 10 may include an input interface, such as a keyboard and/or mouse, may include a detachable medium interface, such as disk medium or memory card, and/or may include a reception interface for receiving information via a communication line.

The output section 30 serves as an interface for outputting predetermined information. The output section 30 may include an output interface for providing an output by visual means, such as a display, may include an output interface for providing an output by auditory means, such as a speaker, and/or may include a transmission interface for transmitting information via a communication line.

Figure 2A:
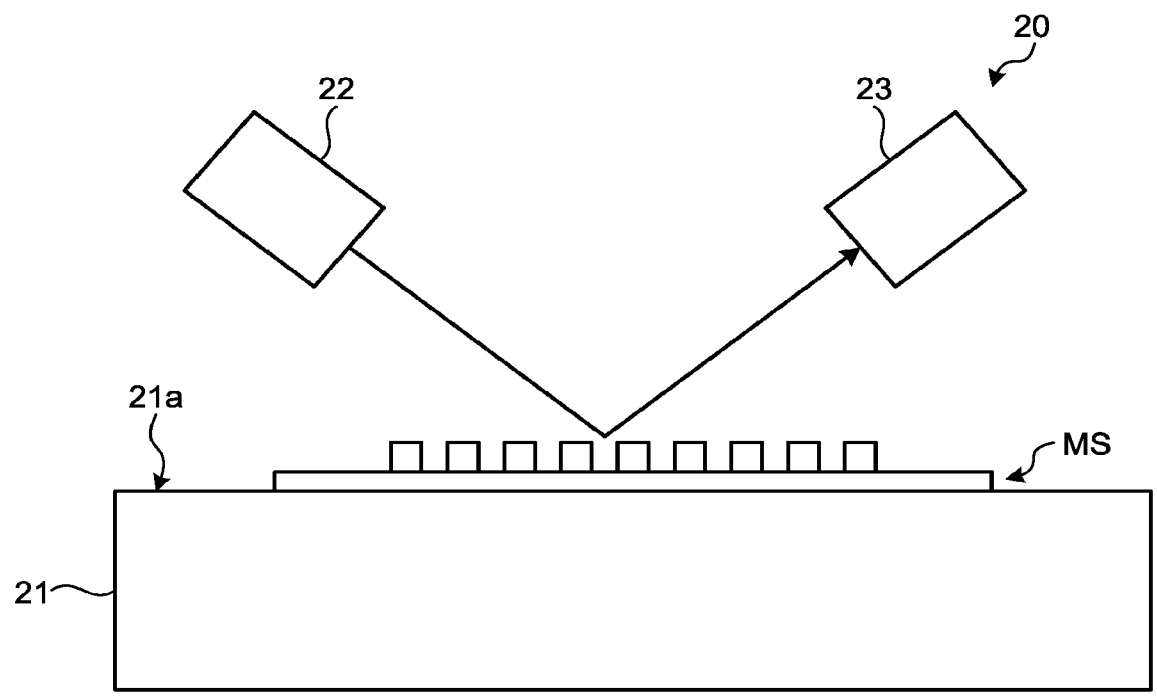
FIGS. 2A and 2B are diagrams illustrating a configuration and an operation of a measurement section according to the embodiment.

The measurement section 20 serves to perform measurement and thereby acquire a response from a sample, under the control of the control section 40. The measurement section 20 is configured to perform measurement using reference data or the like. The measurement to be performed by the measurement section 20 may be exemplified by Optical Critical Dimension (OCD) measurement, X-ray diffraction, and so forth. For example, the measurement section 20 is configured as illustrated in FIG. 2A. FIG. 2A is a diagram illustrating a configuration of the measurement section 20. FIG. 2A exemplifies a configuration in a case where the measurement section 20 is configured to perform the OCD measurement.

The measurement section 20 includes a stage 21, a projector 22, and a detector 23. The stage 21 serves to mount a measurement sample (for example, a substrate) MS thereon. The stage 21 is movable in a direction parallel with a mount face 21a by a drive mechanism (not illustrated) and is rotatable in a plane parallel with the mount face 21a, under the control of the control section 40.

The measurement sample MS may include structural portions (patterns), each of which has a predetermined shape, periodically arranged in a two-dimensional state. Each structural portion is a unit structure that composes a periodic structure. The structural portion may be exemplified by a hole pattern, pillar pattern, or the like.

The projector 22 includes a light source and a polarizer. The projector 22 is configured to generate light by the light source while changing the wavelength (or phase), to adjust the generated light into a predetermined polarization state by the polarizer, and to cause the resultant light to be incident onto the measurement sample (for example, a substrate) MS, under the control of the control section 40. This incident light is reflected on the surface or the like of the measurement sample (for example, a substrate) MS.

The detector 23 includes an analyzer and a spectroscope. The detector 23 is configured to transmit a predetermined polarization component by the analyzer and spectrally disperse the component by the spectroscope, and thereby to detect light intensity as spectra, under the control of the control section 40.

Figure 2B:
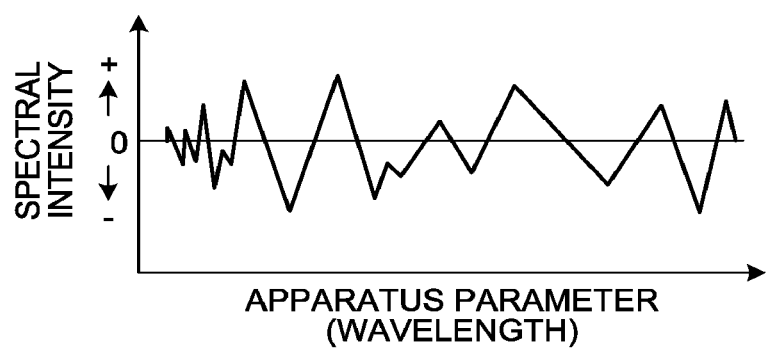

As illustrated in FIG. 2B, the spectra obtained by the measurement section 20 are in a state such that the spectral intensity is associated with a large number of apparatus parameters (for example, a large number of wavelengths). FIG. 2B is a diagram illustrating an operation of the measurement section 20, in which the shape dimensions of the sample MS can be calculated from these spectra.

With reference to FIG. 1 again, the control section 40 is configured to perform processes associated with the principal component analysis (PCA) and the principal component regression (PCR), in addition to control over measurement by the measurement section 20. The control section 40 includes a first analysis part 41, a second analysis part 42, a comparison part 43, a determination part 44, an error notification part 45, and a calculation part 46.

Figure 3:
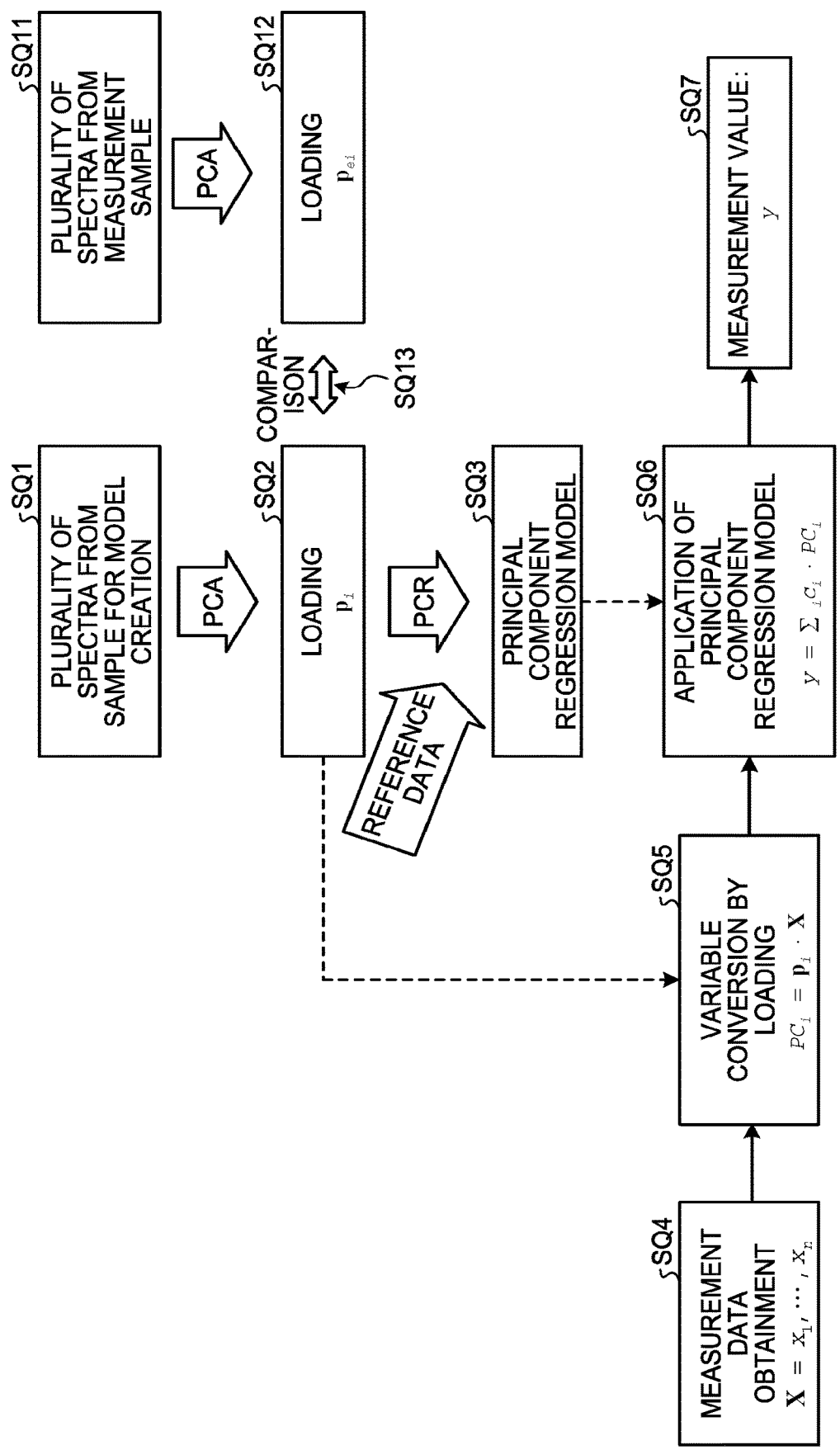
FIG. 3 is a sequence diagram illustrating a measuring method according to the embodiment.

The principal component analysis (PCA) is analysis that consolidates a large number of apparatus parameters into a small number of variables called principal components. As illustrated as SQ1 in FIG. 3, the first analysis part 41 controls the measurement section 20 to obtain a spectrum at every apparatus parameter (wavelength), with respect to a plurality of portions on a sample for model creation (for example, a substrate) MS'. FIG. 3 is a sequence diagram illustrating a measuring method. As illustrated as SQ2 in FIG. 3, the first analysis part 41 performs the principal component analysis (PCA) to the plurality of spectra, and obtains coefficients such that, for example, the variation becomes largest, for the spectral intensity at the respective apparatus parameters (wavelengths). Further, the first analysis part 41 performs multiplication by the obtained coefficients to derive linearly combined variables as a first principal component. The coefficient vector (first loading) containing the respective coefficients obtained for the first principal component may be set in advance in the measuring apparatus.

For example, where "n" is an arbitrary integer of 3 or more, at the respective apparatus parameters $\lambda_1, \lambda_2, \ldots,$ and $\lambda_n$, the values of spectral intensity are expressed by variables $x_1', x_2', \ldots,$ and $x_n'$, with respect to the plurality of portions on the sample for model creation MS'. The collection of these values of spectral intensity will be referred to as "data vector x'". The first analysis part 41 obtains coefficients $p_{1,1}, p_{1,2}, \ldots,$ and $p_{1,n}$ for performing linear combination, to include as much information as possible, for the respective values of spectral intensity $x_1', x_2', \ldots,$ and $x_n'$, with respect to the plurality of portions. The collection of these coefficients (i.e., coefficient vector) will be referred to as "first loading $p_1$". The first analysis part 41 stores the obtained first loading $p_1$ as first loading information 51 into the storage section 50.

At this time, where the first principal component is denoted by $PC_1$, the first principal component $PC_1$ may be expressed by multiplying the data vector x' by the first loading $p_1$, as shown in the following formula 1.

$$PC_1 = p_1 \cdot x' = p_{1,1} x_1' + p_{1,2} x_2' + \ldots + p_{1,n} x_n' \quad (1)$$

The first analysis part 41 obtains coefficients $p_{2,1}, p_{2,2}, \ldots,$ and $p_{2,n}$ for performing linear combination, to include as much information as possible, for the respective values of spectral intensity $x_1', x_2', \ldots,$ and $x_n'$, with respect to the plurality of portions, while preventing these coefficients from being correlated with the first principal component $PC_1$ (i.e., while causing these coefficients to be orthogonal to the first principal component $PC_1$). The collection of these coefficients (i.e., coefficient vector) will be referred to as "second loading $p_2$". The first analysis part 41 stores the obtained second loading $p_2$ as second loading information 52 into the storage section 50.

At this time, where the second principal component is denoted by $PC_2$, the second principal component $PC_2$ may be expressed by multiplying the data vector x' by the second loading $p_2$, as shown in the following formula 2.

$$PC_2 = p_{2,1} \cdot x' = p_{2,1} x_1' + p_{2,2} x_2' + \ldots + p_{2,n} x_n' \quad (2)$$

In the example illustrated here, an n-number of spectral intensity variables $x_1', x_2', \ldots,$ and $x_n'$ are subjected to variable conversion into two principal components $PC_1$ and $PC_2$ (i.e., an n-dimensional coordinate space of the variables $x_1', x_2', \ldots,$ and $x_n'$ is subjected to coordinate conversion into a two-dimensional coordinate space of the principal components $PC_1$ and $PC_2$).

The principal component regression (PCR) is to perform multiple regression analysis by using principal component values and reference data indicating actual values, and thereby to create a regression model. The reference data indicating actual values may be obtained in advance from outside through the input section 10, and may be stored as reference data 53 in the storage section 50. As illustrated as SQ3 in FIG. 3, the first analysis part 41 controls the measurement section 20 to read and obtain the reference data indicating actual values from the storage section 50. For example, when the measurement in the measurement section 20 is the OCD measurement, the reference data may be formed of actual shape dimensions obtained by performing cross-sectional SEM analysis onto the sample for model creation MS'. The first analysis part 41 performs multiple regression analysis by using the reference data as an objective variable "y" and the values of the principal components $PC_1$ and $PC_2$ of the sample for model creation as explanatory variables, and thereby obtains regression coefficients $c_1$ and $c_2$. For example, respective points indicating the plurality of portions on the sample MS' are plotted on the two-dimensional coordinate space of the principal components $PC_1$ and $PC_2$, and are approximated by a least-square method or the like to obtain a straight line. The regression coefficients $c_1$ and $c_2$ are obtained as values corresponding to this straight line. A regression model created in this way may be expressed by the following formula 3. The first analysis part 41 stores the created regression model as regression model information 55 into the storage section 50.

$$y = c_1 * PC_1 + c_2 \cdot PC_2 \tag{3}$$

Consequently, the measuring apparatus 1 is ready for measurement using the principal component analysis (PCA) and the principal component regression (PCR). For example, as illustrated as SQ4 in FIG. 3, the calculation part 46 obtains a spectrum at every apparatus parameter (wavelength), with respect to an attention portion on the measurement sample MS. At the respective apparatus parameters $\lambda_1$, $\lambda_2$, . . . , and $\lambda_n$, the values of spectral intensity are expressed by variables $x_1, x_2, \ldots,$ and $x_n$, with respect to the attention portion on the sample MS. The collection of these values of spectral intensity will be referred to as "data vector x". As illustrated as SQ5 in FIG. 3, the calculation part 46 performs variable conversion by using the loading $p_i$ obtained in SQ2 to turn the data vector x into a principal component $PC_i$. As illustrated as SQ6 in FIG. 3, the calculation part 46 obtains a measurement value by applying the regression model obtained in SQ3. Thus, as illustrated as SQ7 in FIG. 3, the calculation part 46 comes to obtain a measurement value "y". As illustrated in FIG. 3, in the series of flow from SQ4 to SQ7, there is no index for confirming the reliability of the measurement value in principle. Accordingly, it is difficult to determine whether measurement by the measuring apparatus 1 is erroneous measurement or not.

On the other hand, as illustrated as SQ11 in FIG. 3, the second analysis part 42 obtains a spectrum at every apparatus parameter (wavelength), with respect to a plurality of portions on the measurement sample MS. As illustrated as SQ12 in FIG. 3, the second analysis part 42 performs the principal component analysis (PCA) to the plurality of spectra, and obtains coefficients such that, for example, the variation becomes largest, for the spectral intensity at the respective apparatus parameters (wavelengths). Further, the second analysis part 42 performs multiplication by the obtained coefficients to derive linearly combined variables as a first principal component.

For example, at the respective apparatus parameters $\lambda_1$, $\lambda_2$, . . . , and $\lambda_n$, the values of spectral intensity are expressed by variables $x_{e1}, x_{e2}, \ldots,$ and $x_{en}$, with respect to the plurality of portions on the sample MS. The collection of these values of spectral intensity will be referred to as "data vector $x_e$". The second analysis part 42 obtains coefficients $p_{e1,1}, p_{e1,2}, \ldots,$ and $p_{e1,n}$ for performing linear combination, to include as much information as possible, for the respective values of spectral intensity $x_{e1}, x_{e2}, \ldots,$ and $x_{en}$, with respect to the plurality of portions. The collection of these coefficients (i.e., coefficient vector) will be referred to as "evaluation-use first loading $p_{e1}$". The second analysis part 42 supplies the obtained evaluation-use first loading $p_{e1}$ to the comparison part 43.

At this time, where the first principal component is denoted by $PC_{e1}$, the first principal component $PC_{e1}$ may be expressed by multiplying the data vector $x_e$ by the evaluation-use first loading $p_{e1}$, as shown in the following formula 4.

$$PC_{e1} = p_{e1} \cdot x_e = p_{e1,1} x_{e1} + p_{e1,2} x_{e2} + \cdots + p_{e1,n} x_{en} \tag{4}$$

The second analysis part 42 obtains coefficients $p_{e2,1}, p_{e2,2}, \ldots,$ and $p_{e2,n}$ for performing linear combination, to include as much information as possible, for the respective values of spectral intensity $x_{e1}, x_{e2}, \ldots,$ and $x_{en}$, with respect to the plurality of portions, while preventing these coefficients from being correlated with the first principal component $PC_{e1}$ (i.e., while causing these coefficients to be orthogonal to the first principal component $PC_{e1}$). The collection of these coefficients (i.e., coefficient vector) will be referred to as "evaluation-use second loading $p_{e2}$". The second analysis part 42 supplies the obtained evaluation-use second loading $p_{e2}$ to the comparison part 43.

At this time, where the second principal component is denoted by $PC_{e2}$, the second principal component $PC_{e2}$ may be expressed by multiplying the data vector $x_e$ by the evaluation-use second loading $p_{e2}$, as shown in the following formula 5.

$$PC_{e2} = p_{e2} \cdot x_e = p_{e2,1} x_{e1} + p_{e2,2} x_{e2} + \cdots + p_{e2,n} x_{en} \tag{5}$$

The comparison part 43 compares the loading $p_i$ obtained from the first analysis part 41 with the evaluation-use loading $p_{ei}$ obtained from the second analysis part 42, and generates a reliability index for measurement using the principal component analysis, in accordance with the comparison result. The comparison part 43 obtains the coincidence degree between the loading $p_i$ and the evaluation-use loading $p_{ei}$ as the reliability index. For example, as shown in the following formula 6, the comparison part 43 may obtain the Root Mean Square Error (RMSE) between the loading $p_i$ and the evaluation-use loading $p_{ei}$ as the coincidence degree therebetween.

$$RMSE_i = \frac{1}{n} \sqrt{\sum_{i=1}^{n} (p_{ei,j} - p_{i,j})^2} \tag{6}$$

In the formula 6, "n" denotes the number of apparatus parameters (wavelengths) obtained in SQ1 or SQ11 in FIG. 3.

Alternatively, as shown in the following formula 7, the comparison part 43 may obtain the Correlation Coefficient (CC) between the loading $p_i$ and the evaluation-use loading $p_{ei}$ as the coincidence degree therebetween.

$$CC_i = \frac{\frac{1}{n}\sum_{j=1}^{n}(p_{ei,j} - \overline{p_{ei}})(p_{i,j} - \overline{p_i})}{\sqrt{\frac{1}{n}\sum_{j=1}^{n}(p_{ei,j} - \overline{p_{ei}})^2} \times \sqrt{\frac{1}{n}\sum_{j=1}^{n}(p_{i,j} - \overline{p_i})^2}} \tag{7}$$

In the formula 7, "n" denotes the number of apparatus parameters (wavelengths) obtained in SQ1 or SQ11 in FIG. 3. $\overline{p_{ei}}$ denotes the average of the respective elements of the evaluation-use loading $p_{ei}$. $\overline{p_i}$ denotes the average of the respective elements of the loading $p_i$.

FIGS. 4A to 4D are diagrams illustrating a loading comparison process according an example of the embodiment, in a case where the root mean square error RMSE is used, for example. The comparison part 43 compares a first loading $p_1$ obtained in model creation illustrated in FIG. 4A with an evaluation-use first loading $p_{e1}$ obtained in measurement on a measurement sample (1) illustrated in FIG. 4B, and obtains the coincidence degree therebetween illustrated on the left side of FIG. 4D as a reliability index, in accordance with the comparison result.

Further, the comparison part 43 compares the first loading $p_1$ obtained in model creation illustrated in FIG. 4A with an evaluation-use first loading $p_{e1}$ obtained in measurement on a measurement sample (2) illustrated in FIG. 4C, and obtains the coincidence degree therebetween illustrated on the right side of FIG. 4D as a reliability index, in accordance with the comparison result.

As illustrated in FIG. 4D, in the evaluation using the measurement sample (1), the measurement reliability is relatively high with respect to the first loading $p_1$ obtained in model creation. On the other hand, in the evaluation using the measurement sample (2), the measurement reliability is relatively low with respect to the first loading $p_1$ obtained in model creation. Thus, it is conceivable to determine that the measurement reliability is lowered at the time when the evaluation using the measurement sample (2) is performed, which can be used as a trigger to re-create a model.

Accordingly, the comparison part 43 supplies the obtained reliability index (i.e., coincidence degree) to the determination part 44. The determination part 44 determines whether the reliability index (i.e., coincidence degree) is lower than a threshold.

Figure 5:
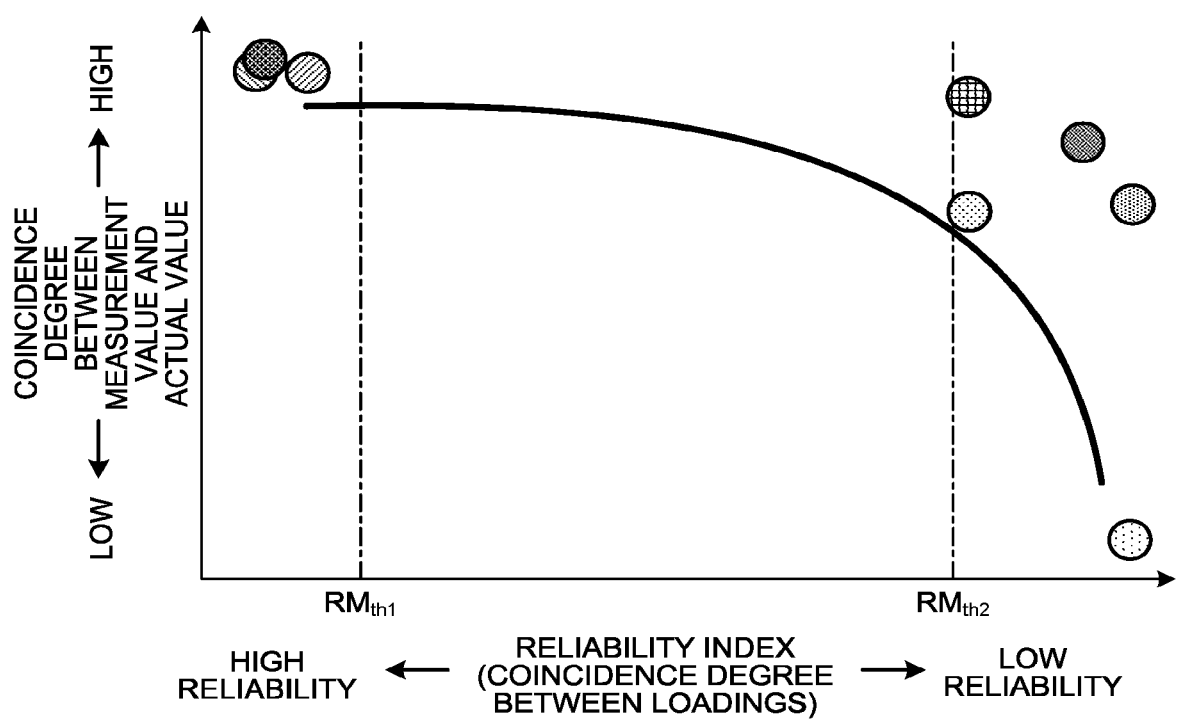
FIG. 5 is a diagram illustrating a reliability determination process according the embodiment.

This threshold may be decided as illustrated in FIG. 5, for example, and set in the determination part 44. FIG. 5 is a diagram illustrating the reliability determination process. In FIG. 5, the vertical axis indicates the coincidence degree between a measurement value and an actual value, and the horizontal axis indicates the reliability index (e.g., the coincidence degree between a loading obtained in model creation and an evaluation-use loading obtained in measurement on a measurement sample). For example, the coincidence degree between a measurement value and an actual value may be obtained by the correlation coefficient CC' between an actual shape dimension obtained by performing sectional SEM analysis and a measurement value "y" obtained by the calculation part 46. Where "n" is an arbitrary integer of 2 or more, and combinations of an actual value and a measurement value are denoted by $(x_1,y_1)$, $(x_2,y_2)$, and $(x_N,y_N)$, the correlation coefficient CC' may be obtained by the following formula 8.

$$CC' = \frac{\frac{1}{N}\sum_{i=1}^{n}(x_i - \overline{x})(y_i - \overline{y})}{\sqrt{\frac{1}{N}\sum_{i=1}^{n}(x_i - \overline{x})^2} \times \sqrt{\frac{1}{N}\sum_{i=1}^{n}(y_i - \overline{y})^2}} \quad (8)$$

In the formula 8, N denotes the number of measurement values or the number of actual values. $\overline{x}$ denotes the average of the actual values. $\overline{y}$ denotes the average of the measurement values.

In FIG. 5, a solid line illustrates a curve obtained by approximation of points plotted in accordance with evaluation. On the basis of the change of this curve, when the margin for the trial production stage or the like is to be set loose, a loose threshold RMth2 may be set in the determination part 44. Further, when the margin for the mass production stage or the like is to be set strict, a strict threshold RMth1 may be set in the determination part 44.

The determination part 44 determines whether a reliability index (i.e., coincidence degree) is lower than a threshold, and supplies the determination result to the error notification part 45 and the calculation part 46.

When a determination result by the determination part 44 indicates that the reliability index (i.e., coincidence degree) is lower than the threshold, the error notification part 45 gives notice of error information via the output section 30. The notification of the error information may be performed by visual means, or may be performed by auditory means. As the visual means, for example, the output section 30 may be configured to display an error message on a display, or may be configured to light or blink an alarm lamp. As the auditory means, for example, the output section 30 may be configured to output an error message by a voice from a speaker, or may be configured to sound a buzzer. Thus, a user can recognize that the measurement reliability has been lowered, and can be urged to re-create a model.

When a determination result by the determination part 44 indicates that the reliability index (i.e., coincidence degree) is not lower than the threshold, the calculation part 46 calculates a measurement value "y" in accordance with the procedures of SQ4 to SQ7 in FIG. 3. Thus, it is possible to obtain a measurement value "y" in a state where the reliability is secured within an acceptable range.

Figure 6:
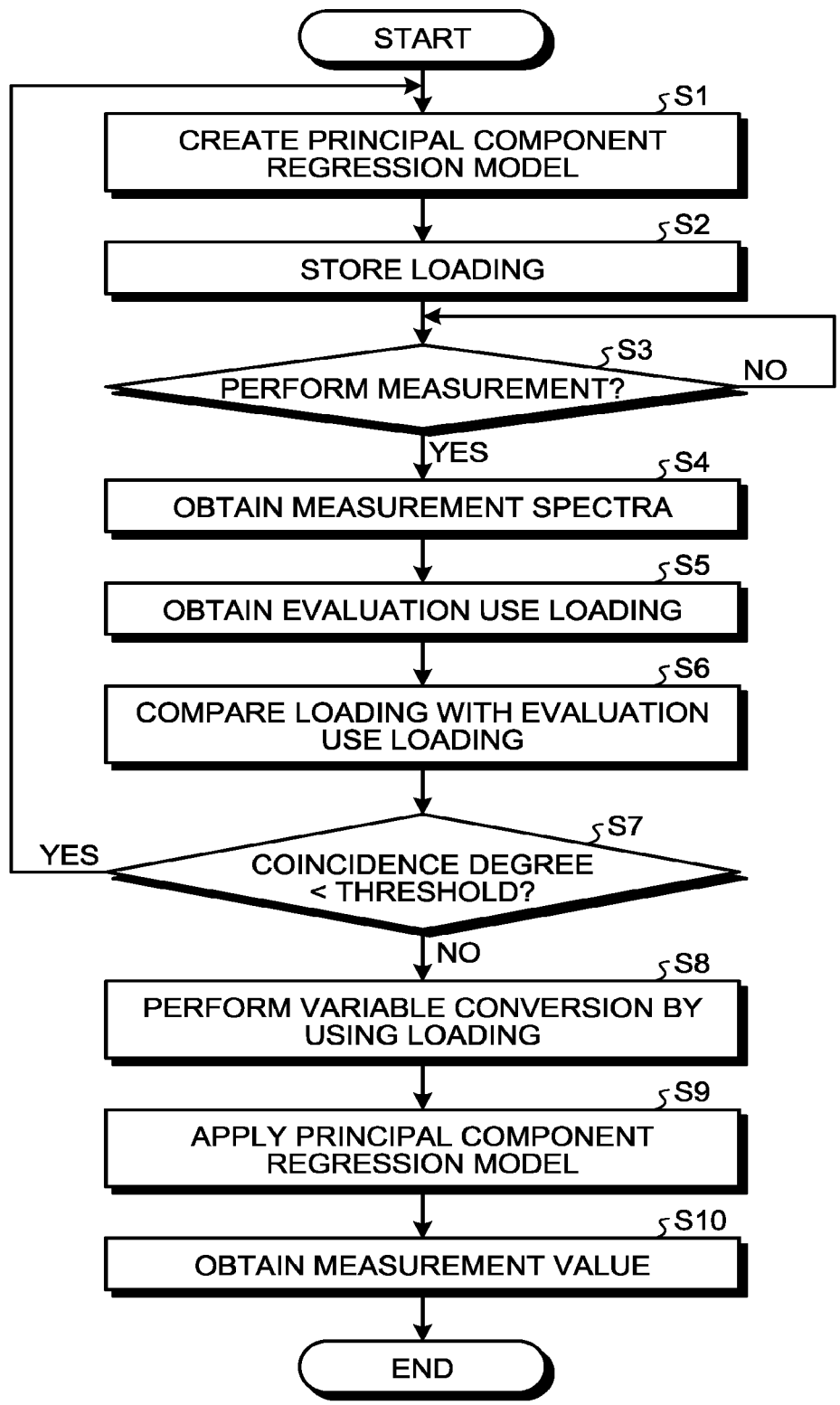
FIG. 6 is a flowchart illustrating a measuring method according to the embodiment.

Next, an explanation will be given of the flow of measurement by the measuring apparatus 1, with reference to FIG. 6. FIG. 6 is a flowchart illustrating a measuring method.

In accordance with the procedures of SQ1 to SQ3 in FIG. 3, the measuring apparatus 1 creates a principal component regression model (S1), and stores loading information and regression model information into the storage section 50 (S2). The measuring apparatus 1 waits until the timing to measure a measurement sample (No at S3). When the timing to measure the measurement sample comes (Yes at S3), the measurement section 20 obtains measurement spectra (S4). The measuring apparatus 1 performs the principal component analysis onto the measurement spectra, and thereby obtains an evaluation-use loading (S5). The measuring apparatus 1 compares the loading stored in S2 with the evaluation-use loading obtained in S5 (S6), and obtains the coincidence degree therebetween as a reliability index in accordance with the comparison result. When the coincidence degree is lower than a threshold (Yes at S7), the measuring apparatus 1 returns the sequence back to S1 to re-create a model. When the coincidence degree is not lower than the threshold (No at S7), the measuring apparatus 1 deems that the measurement reliability is secured within an acceptable range. Thus, the measuring apparatus 1 performs variable conversion to the measurement spectra obtained in S4 by using the loading stored in S2 to obtain a principal component value (S8), and applies the principal component regression model to the principal component value (S9) to obtain a measurement value "y" (S10).

As described above, in this embodiment, the measuring apparatus 1 is configured to compare a loading obtained in advance in model creation with an evaluation-use loading obtained from spectra of a measurement sample, and to generate a reliability index in accordance with the comparison result. Thus, it is possible to perform reliability evaluation in measurement using the principal component analysis. Consequently, it is possible to determine whether measurement by the measuring apparatus 1 is erroneous measurement or not, and ease improvement of the measurement reliability using the principal component analysis may be achieved.

It should be noted that, this embodiment has been exemplified by a case where the principal component analysis is performed by using mainly two principal components (a first principal component and a second principal component). However, the idea according to this embodiment may be applied to a case where the principal component analysis is performed by using a first principal component only. Alternatively, the idea according to this embodiment may be applied also to a case where the principal component analysis is performed by using three or more principal components (for example, a first principal component, a second principal component, . . . , and a k-th principal component, where "k" is an arbitrary integer of 3 or more).

Figure 7:
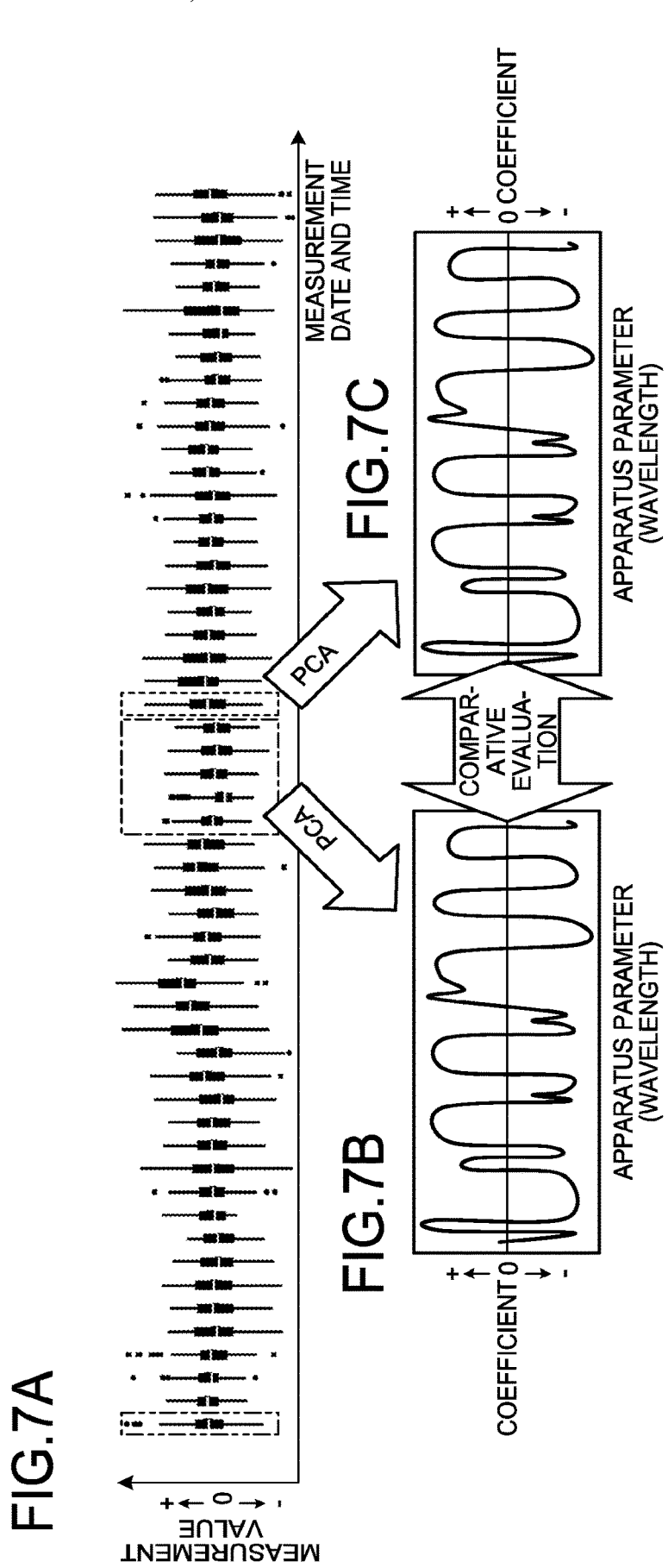
FIGS. 7A to 7C are diagrams illustrating a loading comparison process according a modification of the embodiment.

Alternatively, as illustrated in FIGS. 7A to 7C, in relation to a measurement trend, when evaluation is to be performed to the reliability of a measurement value, it may be adopted to compare a loading calculated from an evaluation sample with a loading calculated from a sample subjected to measurement immediately before, to evaluate the consistency therebetween. FIGS. 7A to 7C are diagrams illustrating a loading comparison process according a modification of the embodiment.

For example, in the measurement trend illustrated in FIG. 7A, with the lapse of a long period of time from the model creation time point indicated by surrounding of a two-dot chain line to the measurement time point indicated by surrounding of a broken line, the trend of the measured value could be significantly changed. If there is a significant change, this may indicate a sign of an abnormality to occur in the measuring apparatus 1. Accordingly, it is conceivable to have stored evaluation-use loadings of immediate precedents illustrated in FIG. 7B, which have been obtained from a plurality of spectra at a plurality of measurement time points indicated by surrounding of a one-dot chain line immediately before the measurement. Specifically, when an evaluation-use loading illustrated in FIG. 7C is obtained from a plurality of spectra at the measurement time point indicated by surrounding of a broken line, the evaluation-use loading illustrated in FIG. 7B is compared with the evaluation-use loading illustrated in FIG. 7C.

Figure 8:
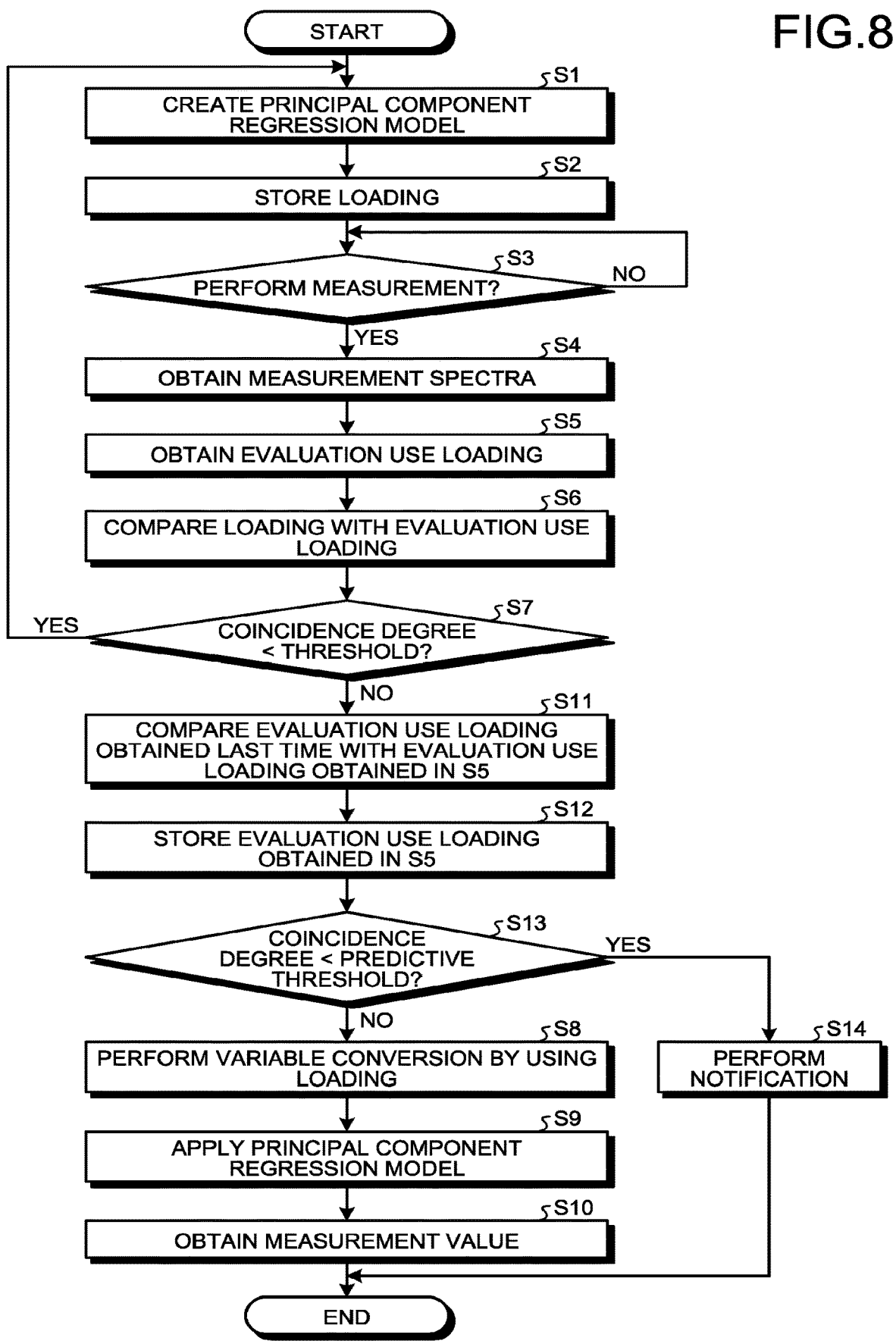
FIG. 8 is a flowchart illustrating a measuring method according to the modification of the embodiment.

In this case, as illustrated in FIG. 8, the flow of measurement by the measuring apparatus 1 is different from that of the embodiment as follows. FIG. 8 is a flowchart illustrating a measuring method according to the modification of the embodiment. After performing the processes of S1 to S7, the measuring apparatus 1 compares the evaluation-use loading obtained last time with the evaluation-use loading obtained in S5 (S11), and obtains the coincidence degree therebetween as a reliability index for the measurement trend, in accordance with the comparison result. Further, the measuring apparatus 1 stores the evaluation-use loading obtained in S5 into the storage section 50, for comparison in S11 of the next time (S12). Then, when the coincidence degree obtained in S11 is lower than a predictive threshold (Yes at S13), the measuring apparatus 1 notifies the user of a predictive alarm indicating that there is a sign of an abnormality to occur in the measuring apparatus 1 (S14). When the coincidence degree obtained in S11 is not lower than the predictive threshold (No at S13), the measuring apparatus 1 deems that there is no sign of an abnormality to occur in the apparatus, and performs the processes from S8 to obtain a measurement value "y" (S10).

As described above, by comparing an evaluation-use loading of an immediate precedent with the current evaluation-use loading, it is possible to obtain a reliability index (coincidence degree) for the measurement trend with high accuracy, and to detect a sign of an abnormality to occur in the measuring apparatus 1.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A measuring apparatus comprising:
   a measurement section configured to acquire a response from a sample; and
   a control section configured to compare a loading obtained by performing principal component analysis in advance with a first evaluation-use loading obtained by performing principal component analysis onto the response acquired from the sample, and to generate a first reliability index for measurement using principal component analysis, in accordance with a comparison result.

2. The measuring apparatus according to claim 1, further comprising a storage section that stores the loading obtained by performing principal component analysis in advance,
   wherein the control section is configured to obtain the first evaluation-use loading by performing principal component analysis onto the response acquired from the sample, and to compare the stored loading with the obtained first evaluation-use loading.

3. The measuring apparatus according to claim 2, wherein the control section is configured to further compare the first evaluation-use loading with a second evaluation-use loading obtained by performing principal component analysis onto a response previously acquired from another sample, and to generate a second reliability index for measurement using principal component analysis, in accordance with a comparison result.

4. The measuring apparatus according to claim 3, wherein the control section is configured to obtain the second evaluation-use loading by performing principal component analysis onto responses previously acquired from a plurality of other samples.

5. The measuring apparatus according to claim 3, wherein the storage section stores therein the second evaluation-use loading.

6. The measuring apparatus according to claim 5, wherein the storage section stores therein the first evaluation-use loading after the control section compares the first evaluation-use loading with the second evaluation-use loading.

7. The measuring apparatus according to claim 3, wherein the first evaluation-use loading includes a second coefficient vector obtained by performing principal component analysis onto a response acquired from the sample, the second evaluation-use loading includes a third coefficient vector obtained by performing principal component analysis onto the response previously acquired from another sample, and the control section is configured to obtain a second coincidence degree between the second coefficient vector and the third coefficient vector as the second reliability index.

8. The measuring apparatus according to claim 7, wherein the second coincidence degree includes a root mean square error between the second coefficient vector and the third coefficient vector, or a correlation coefficient between the second coefficient vector and the third coefficient vector.

9. The measuring apparatus according to claim 7, wherein the control section is configured to give notice of information indicating a sign of an abnormality when the second coincidence degree is lower than a second threshold.

10. The measuring apparatus according to claim 7, wherein the control section is configured to obtain a measurement value corresponding to the response acquired from the sample by using a first coefficient vector and a regression coefficient when the second coincidence degree is more than or equal to a second threshold.

11. The measuring apparatus according to claim 1, wherein the loading obtained by performing principal component analysis in advance includes a first coefficient vector obtained by performing principal component analysis in advance, the first evaluation-use loading includes a second coefficient vector obtained by performing principal component analysis onto the response acquired from the sample, and the control section is configured to obtain a first coincidence degree between the first coefficient vector and the second coefficient vector as the first reliability index.

12. The measuring apparatus according to claim 11, wherein the first coincidence degree includes a root mean square error between the first coefficient vector and the second coefficient vector, or a correlation coefficient between the first coefficient vector and the second coefficient vector.

13. The measuring apparatus according to claim 11, wherein the control section is configured to give notice of error information when the first coincidence degree is lower than a first threshold.

14. The measuring apparatus according to claim 11, wherein the control section is configured to re-obtain the loading obtained by performing principal component analysis in advance when the first coincidence degree is lower than a first threshold.

15. The measuring apparatus according to claim 11, wherein the control section is configured to obtain a measurement value corresponding to the response acquired from the sample by using the first coefficient vector and a regression coefficient when the first coincidence degree is more than or equal to a first threshold.

16. The measuring apparatus according to claim 15, wherein the control section is configured to obtain the regression coefficient in advance by performing principal component regression using reference data and a principal component value according to the loading obtained by performing principal component analysis in advance.

17. The measuring apparatus according to claim 1, wherein the measurement section is configured to perform optical measurement to the sample, and to detect a spectrum from the sample as the response.

18. The measuring apparatus according to claim 17, wherein the control section is configured to obtain a dimensional shape of the sample corresponding to the spectrum acquired from the sample.

19. The measuring apparatus according to claim 1, wherein the control section is configured to compare a plurality of loadings obtained by performing principal component analysis in advance with a plurality of first evaluation-use loadings individually, and to generate the first reliability index, in accordance with respective comparison results.

20. The measuring apparatus according to claim 19, wherein the plurality of loadings obtained by performing principal component analysis in advance include a plurality of first coefficient vectors obtained by individually performing principal component analysis in advance, the plurality of first evaluation-use loadings include a plurality of second coefficient vectors obtained by individually performing principal component analysis onto the response acquired from the sample, and the control section is configured to obtain a coincidence degree between the plurality of first coefficient vectors and the plurality of second coefficient vectors as the first reliability index.

* * * * *